(12) United States Patent
Lord

(10) Patent No.: US 8,496,787 B2
(45) Date of Patent: Jul. 30, 2013

(54) METHOD AND APPARATUS FOR EFFLUENT FREE SEA WATER DESALINATION

(76) Inventor: Michael John Lord, Antelope, CA (US)

( * ) Notice: Subject to any disclaimer, the term of this patent is extended or adjusted under 35 U.S.C. 154(b) by 605 days.

(21) Appl. No.: 12/509,481

(22) Filed: Jul. 26, 2009

(65) Prior Publication Data
US 2011/0017583 A1 Jan. 27, 2011

(51) Int. Cl.
C02F 1/06 (2006.01)
C02F 1/12 (2006.01)
B01D 1/16 (2006.01)
B01D 1/28 (2006.01)
B01D 3/06 (2006.01)

(52) U.S. Cl.
USPC ............ 203/10; 159/2.1; 159/24.2; 159/46; 159/48.1; 159/901; 202/167; 202/176; 202/182; 202/236; 202/268; 203/24; 203/88; 203/90; 203/98; 203/100

(58) Field of Classification Search
USPC ............... 159/2.1, 24.2, 46, 47.1, 48.1, 901, 159/DIG. 40; 202/167, 176, 182, 236, 268; 203/10, 24, 88, 90, 98, 100, DIG. 4, DIG. 8, 203/DIG. 17; 62/115
See application file for complete search history.

(56) References Cited

U.S. PATENT DOCUMENTS

| | | | |
|---|---|---|---|
| 3,607,668 A | 9/1971 | Williamson | |
| 3,933,576 A * | 1/1976 | Rushton | 159/27.2 |
| 4,054,493 A | 10/1977 | Roller | |
| 4,055,480 A * | 10/1977 | Smith et al. | 208/390 |
| 4,124,438 A * | 11/1978 | Mattern | 159/47.1 |
| 4,566,947 A * | 1/1986 | Tsuruta | 203/26 |
| 5,248,387 A | 9/1993 | Hansen | |
| 5,428,118 A * | 6/1995 | Painter et al. | 526/74 |
| 6,336,429 B1 * | 1/2002 | Wiener et al. | 122/488 |
| 6,365,005 B1 * | 4/2002 | Schleiffarth | 203/1 |
| 6,506,281 B1 * | 1/2003 | Casper et al. | 159/49 |

(Continued)

FOREIGN PATENT DOCUMENTS
WO WO2007132477 A1 11/2007

OTHER PUBLICATIONS

Desalination 136 (2001) 3-12 Distillation plant development and cost update Neil M. Wade Received Jul. 3, 2000; accepted Jul. 14, 2000 Tel. +44 (1273) 556711; Fax +44 (1273) 235323; email: nwade@55withdean.freeserve.co.uk.

Primary Examiner — Virginia Manoharan
(74) Attorney, Agent, or Firm — Heisler & Associates

(57) ABSTRACT

A method and apparatus for eliminating brine effluent from desalination plants by distillation, is disclosed. To eliminate the brine the salt is converted into a solid and all of the water in the brine is converted to distilled water. The key to achieving this is reducing or eliminating the scale formation in the heating chamber. In one embodiment the process can be used to reduce or eliminate scale formation in a vapor compression sea water desalinization system and there-by use this system to produce drinking water. This process requires no chemical additives but relies entirely upon separation of the process of vaporization of the fluid involved, from the process of heating of the fluid. In one embodiment of this apparatus sea water can be desalinated and the resulting products can be dry salt and pure water leaving no brine return to the ocean. This embodiment also can be used to desalinate concentrated brine from any available source and make a profit on the salt sales, as the salt sells for more than it costs to produce the water and salt separation.

2 Claims, 4 Drawing Sheets

U.S. PATENT DOCUMENTS

| | | | |
|---|---|---|---|
| 6,551,466 B1* | 4/2003 | Kresnyak et al. | 203/26 |
| 6,685,802 B1* | 2/2004 | Nazzer | 203/1 |
| 6,936,140 B2 | 8/2005 | Paxton et al. | |
| 6,984,292 B2* | 1/2006 | Kresnyak et al. | 203/1 |
| 7,083,730 B2 | 8/2006 | Davis | |
| 8,282,772 B2* | 10/2012 | Jepson | 159/47.3 |
| 2003/0089590 A1 | 5/2003 | Paxton et al. | |
| 2007/0298477 A1* | 12/2007 | Kratochvil et al. | 435/165 |

* cited by examiner

Simple Still

Efficient Still with Solid Removal

METHOD AND APPARATUS FOR EFFLUENT FREE SEA WATER DESALINATION

CROSS-REFERENCE TO RELATED APPLICATIONS

This application claims no benefit of any other patents.

FEDERALLY SPONSORED RESEARCH

None—Not Applicable

SEQUENCE LISTING OR PROGRAM

None—Not Applicable

BACKGROUND

1. Field

This application relates to an apparatus and method of distilling a liquid such as sea water or, concentrated salt brine, that is capable of separating the dissolved solids into a dry solid by-product and a pure distillate. In the case of sea water the solid by-product is dry salt and the liquid is pure drinking water.

2. Prior Art

Distilling of Sea Water has been, by and large, cost prohibitive, very problematic to keep in operation, and environmentally unfriendly. Both distillation and reverse osmoses systems return concentrated brine along with sometimes, other added chemicals used to de-foam, reduce scale or kill plant growth, to be disposed of, usually back into the ocean. This has caused concern as to the potential damage to the ocean environment that these methods of making drinking water may pose as well as the cost of disposing of this brine effluent. In addition to the environmental concerns that the desalinization process poses, the high costs associated with either distillation or Reverse Osmoses processes have essentially limited or eliminated the wide spread use. When this apparatus and method are embodied as a sea water distillation system, all of these concerns and issues go away. This apparatus can produce drinking water on a large scale, at a price that is competitive with pumping from a ground well, and produces no brine effluent to be disposed of.

Methods for sea water desalination by distillation have been proposed in a number of different technologies. Two major methods are described here as examples:

Distillation Method—Low Efficiency Type

One form of this method involves raising the temperature of sea water at atmospheric pressure above 100.degree C. to produce steam. The steam is then condensed using either ambient air or water as the cooling medium to condense the steam back to pure water. This method has the following advantages:

1. Most bacteria are killed off as the water temperatures are above 65.degree. C.;
2. Systems are easily monitored due to visible boiling taking place;
3. Total Dissolved Solids (TDS) of <20 ppm are left in the distilled water.

However this method also has a number of disadvantages including:

1. Very inefficient as heat of vaporization is lost in condensing the distillate.
2. At high temperatures any solids in the sea water will congeal. The congealed solids are deposited on the surface of the heating chamber causing further reduction in efficiency.

Another form of this method of distilling sea water is to reduce the temperature of the boiling point of water by lowering the pressure in the distillation chamber. This method is favored on ships due to its lower energy consumption. The major drawback with this system is that the distillation temperature is too low to kill bacteria and ultra violet lamp generated ozone is usually needed to kill bacteria in the distilled water. It is also not suitable for large scale applications due to the difficulty of maintaining the distillation chamber at below atmospheric pressures. The above systems use either a boiler arrangement where water is heated and vaporized in the same chamber or an arrangement where water is superheated in a heating chamber and then flashed evaporated in a vaporization chamber. Neither of these approaches have used a water recirculation system to re-circulate the raw water back from the vaporization chamber to the heating chamber for further water reductions.

Distillation Method—High Efficiency Type

High efficiency distillers come in two principle types. The first is the Vapor Compression Distiller and the second is the Multiple Effects Distiller. Both types of distillers recapture the latent heat of vaporization contained in the vapor that is produced. Both of these distillers suffer from the problems of the heating surfaces in the boilers being covered by scale and there by loosing efficiency. When scale builds up, chemicals are added to prevent the build up of scale on the surfaces, or frequent cleaning and down time are the results. Neither type of still can easily be used to produce water and dry salt as this makes the scale problems much worse. Both systems usually return concentrated brine back into the ocean. If chemicals have been added, for any reason, they also are discharged back into the ocean with the brine. The brine, or brine chemical combination, that is discharged into the ocean poses environmental concerns.

Dissolved Salt

For most sea water distillation systems the salt is a great problem and is considered to have no economic value. If the salt could be separated, then it turns out that the salt that is dissolved in ocean water is worth more than the water. Traditional methods of desalinating ocean water do not capture the salt, and the value of the salt is lost. With this apparatus we can separate the salt from the water and sell each product separately. In today's market the value of the salt is enough to pay for the cost of distilling the ocean water with this apparatus. The pure water output is essentially free as though it was being pumped from the ground. Using concentrated brine from any available source as feed stock for this distiller only enhances the profitability of this device.

SUMMARY

In Accordance with one embodiment of this apparatus, a desalination plant taking water from the ocean that produces a solid salt output and a pure water output, eliminates the environmental and economic issues that have prevented desalination from becoming more widespread. In fact as this embodiment works even more economically when fed brine of higher concentrations, it is likely that it will find use in cleaning up the effluent from existing plants.

DETAILED DESCRIPTION OF THE PREFERRED EMBODIMENT

DRAWINGS—REFERENCE NUMERALS

1. Vaporization and Filtering Chamber
2. Connection pipe between Heating Chamber and Vaporization Chamber with Heated Pressurized Liquid to be Vaporized
3. Nozzle for creating spay and reducing pressure on liquid
4. Un-Evaporated Liquid
5. Vapor Output from Vaporization Chamber
6. Heating Chamber.
7. Liquid pressurization and circulation pump.
8. Vapor Compressor
9. Condensing Unit
10. Pressure Control Valve
11. Distilled Pure Liquid Out
12. Solid Particle Filter
13. Raw Liquid Input
14. Liquid Level Sensor
15. Auger for Solid Removal
16. Solid Salt Precipitate
17. Solid removal pump

DESCRIPTION OF DRAWINGS

Figure 1:
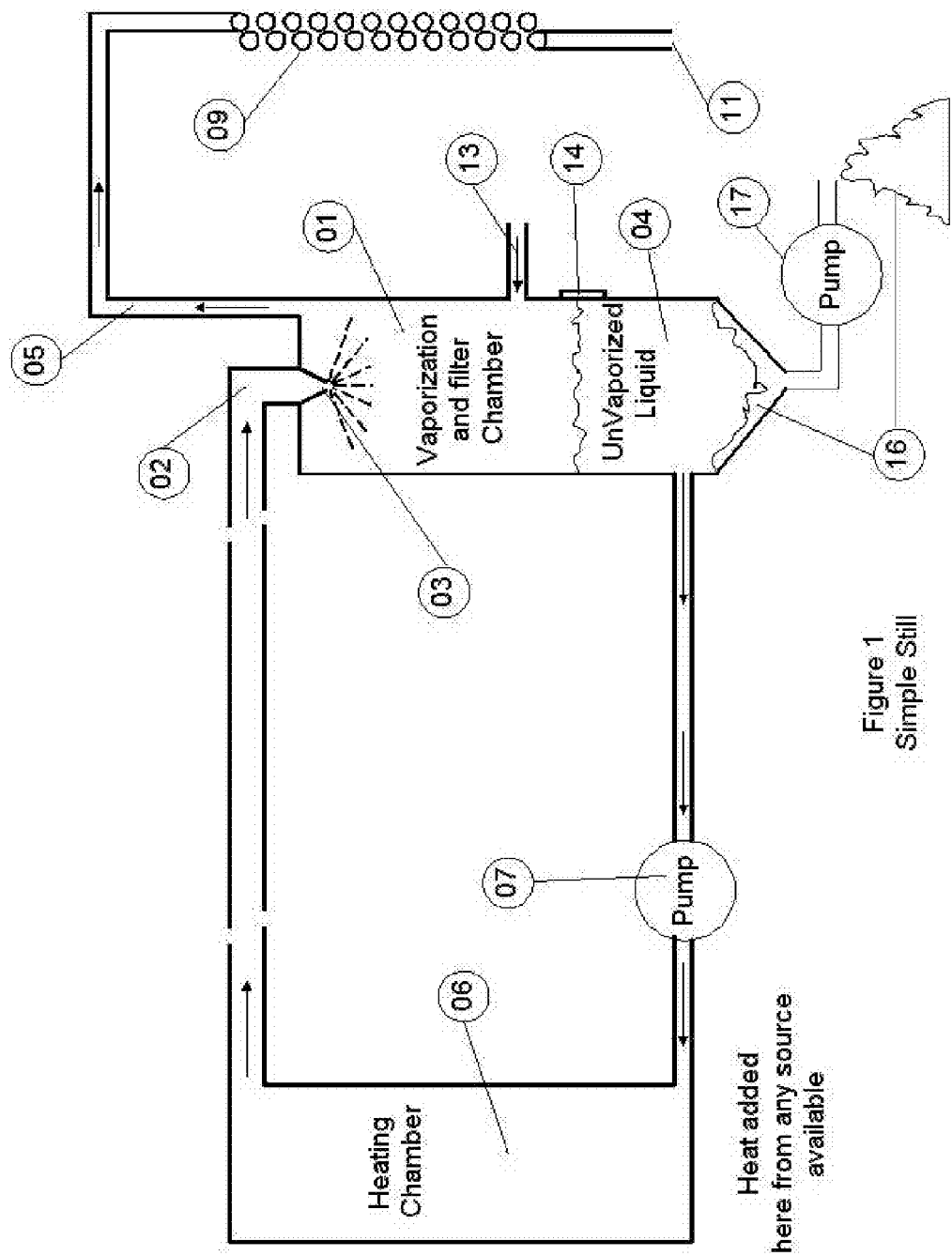
FIG. 1 is a schematic depicting a first simplified apparatus for desalinization according to this invention.

FIG. 1 Shows an embodiment of this apparatus in its simple form. In this example sea water is being distilled. This embodiment might be used for small portable applications where space or cost is an issue. Feed water comprising raw sea water enters the system thru port (13) to maintain a level of liquid (04) controlled by the level sensor (14) in the bottom of the vaporization chamber (01). A pump (07) circulates the concentrated brine, under sufficient pressure as to prevent vapor from forming, into the heating chamber (06). Heat is added to the brine in the heating chamber (06) from any source available, whether it is electric heating, gas heating or any other heating source. The heated brine from the heating chamber (06), being under pressure, is forced through a pressure lowering nozzle (03) into the vaporizing chamber (01) where a portion of the heated brine vaporizes. As the vaporization chamber (01) is maintained at 1 atmosphere, a portion of the incoming heated brine vaporizes. This vaporizing has the effect of cooling the remaining brine to approximately 228 deg F. which is the boiling point of saturated brine at 1 ATM. In addition to cooling the un-vaporized water, a solid salt precipitate forms (16) which settles to the bottom of the vaporization chamber (01). This solid precipitate may be removed by a pump (17) and put into a pile (16). Any water that drains from the salt pile (16) is returned into the feed water. In operation the Un-evaporated liquid (04) in the vaporization chamber (01) becomes saturated with brine as the process continues. The un-vaporized water in the vaporization chamber (01) is now pumped (07) to the heating chamber (06) to start the process over. Vaporized water (steam) in the vaporization chamber (01) is removed (05) and routed to a condenser (09) where the latent heat of vaporization is removed causing the liquid to condense. Pure distilled drinking water is taken out (11) of the condenser to be used. The solids that were dissolved in the sea water form a pile (16) where they wait to be sold. Any liquid brine that drains from the salt pile is returned as feed water back into the vaporization chamber (01). No brine effluent is produces as all of the sea water is converted to either a dry solid or pure drinking water.

Figure 2:
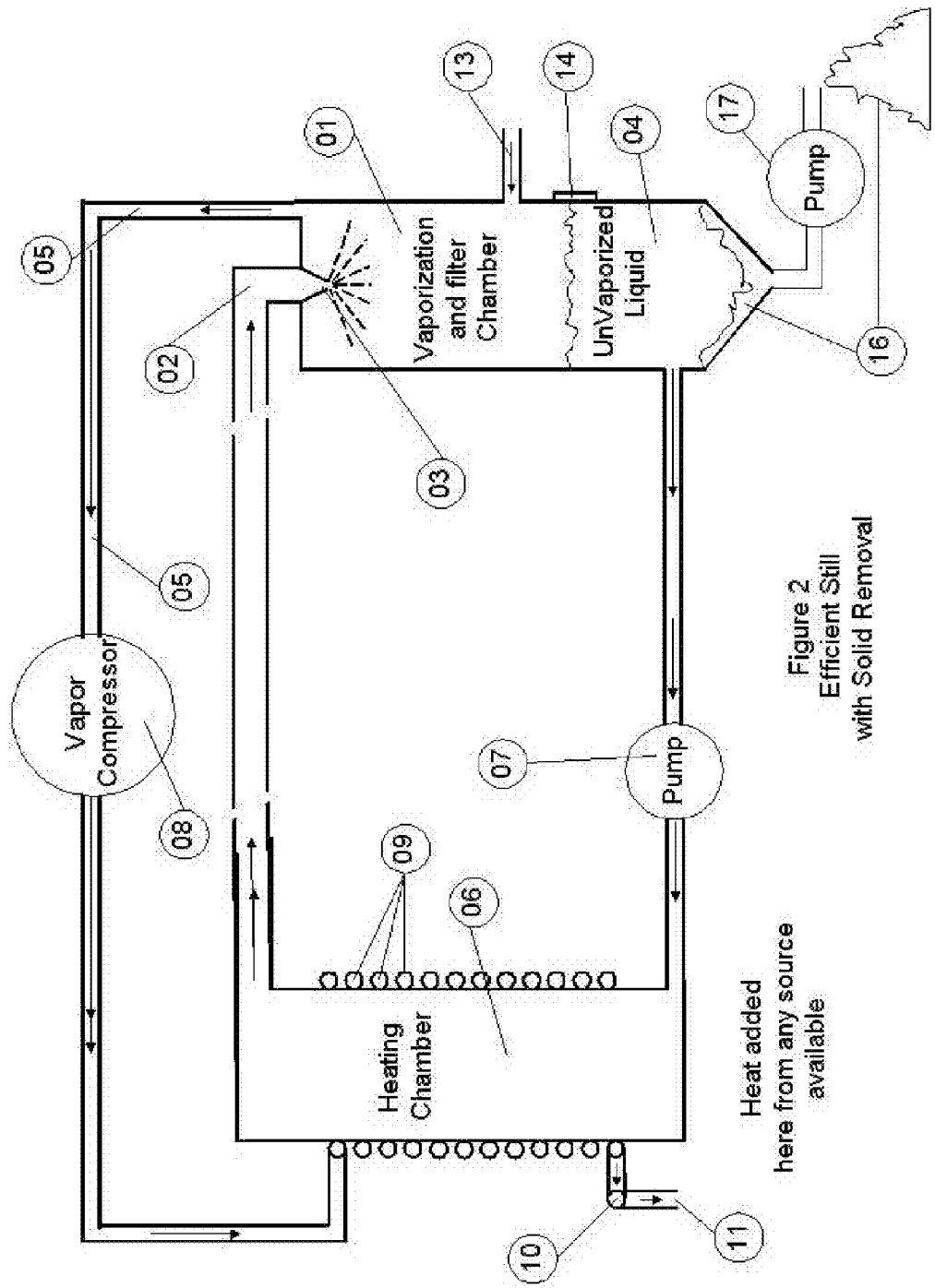
FIG. 2 is a schematic of a higher efficiency variation of that which is shown in FIG. 1.

FIG. 2 Shows an embodiment of this apparatus in a more efficient form. In this example sea water is being distilled. This embodiment might be used for large municipal applications, where cost of the product water is an issue. Feed water comprising raw sea water enters the system thru port (13) to maintain a level of liquid (04) controlled by the level sensor (14) in the bottom of the vaporization chamber (01). A pump (07) circulates the concentrated brine, under sufficient pressure as to prevent vapor from forming, into the heating chamber (06). Heat is added to the brine in the heating chamber (06) from any source available, whether it is electric heating, gas heating or any other heating source. The heated brine from the heating chamber (06), being under pressure, is forced through a pressure lowering nozzle (03) into the vaporizing chamber (01) where a portion of the heated brine vaporizes. As the vaporization chamber (01) is maintained at 1 atmosphere, a portion of the incoming heated brine vaporizes. This vaporizing has the effect of cooling the remaining brine to approximately 228 deg F. which is the boiling point of saturated brine at 1 ATM. In addition to cooling the un-vaporized water, a solid salt precipitate forms (16) which settles to the bottom of the vaporization chamber (01). This solid precipitate may be removed by a pump (17) and put into a pile (16). Any water that drains from the salt pile (16) is returned into the feed water. In operation the Un-evaporated liquid (04) in the vaporization chamber (01) becomes saturated with brine as the process continues. The un-vaporized water in the vaporization chamber (01) is now pumped (07) to the heating chamber (06) to start the process over. Vaporized water (steam) is removed by (05) and routed to a compressor (08) where the temperature of condensation of the steam is increased. Also this compressor adds heat energy to the compressed steam as well. This compressed steam goes to a condenser (09) were the latent heat of vaporization, plus the heat added by the compressor work, is returned to the concentrated brine in the heating chamber (06). The heat from the latent heat of vaporization is sufficient to raise the temperature of saturated brine in the heating chamber (06) to a sufficient amount where it will vaporize in the vaporization chamber (01). The heat added by the compressor is sufficient to make up for any losses of heat, that a well insulated system suffers. For this reason, after the initial start up, very little or no, other outside heat needs to be added to the boiling chamber (06). The condenser (09) produces pure distilled liquid water (11) for drinking. The solids that were dissolved in the sea water form a pile (16) where they wait to be sold. Any liquid brine that drains from the salt pile is returned as feed water back into the vaporization chamber (01). No brine effluent is produces as all of the sea water or brine, is converted to either a dry solid or pure drinking water.

Figure 3:
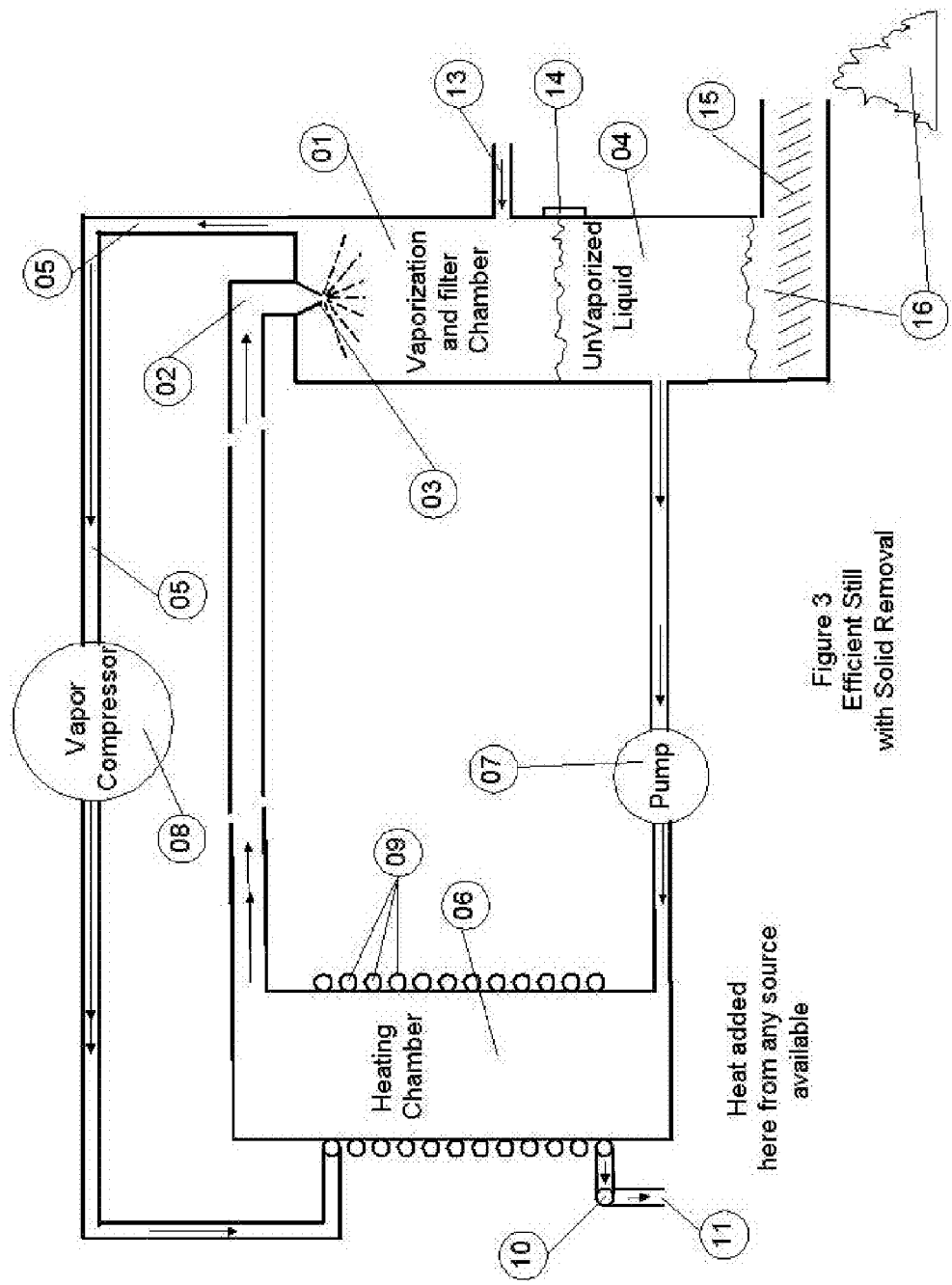
FIG. 3 is a schematic of an alternative embodiment of that which is shown in FIG. 2, featuring auger removal of solids rather than pump removal of solids.
Figure 4:
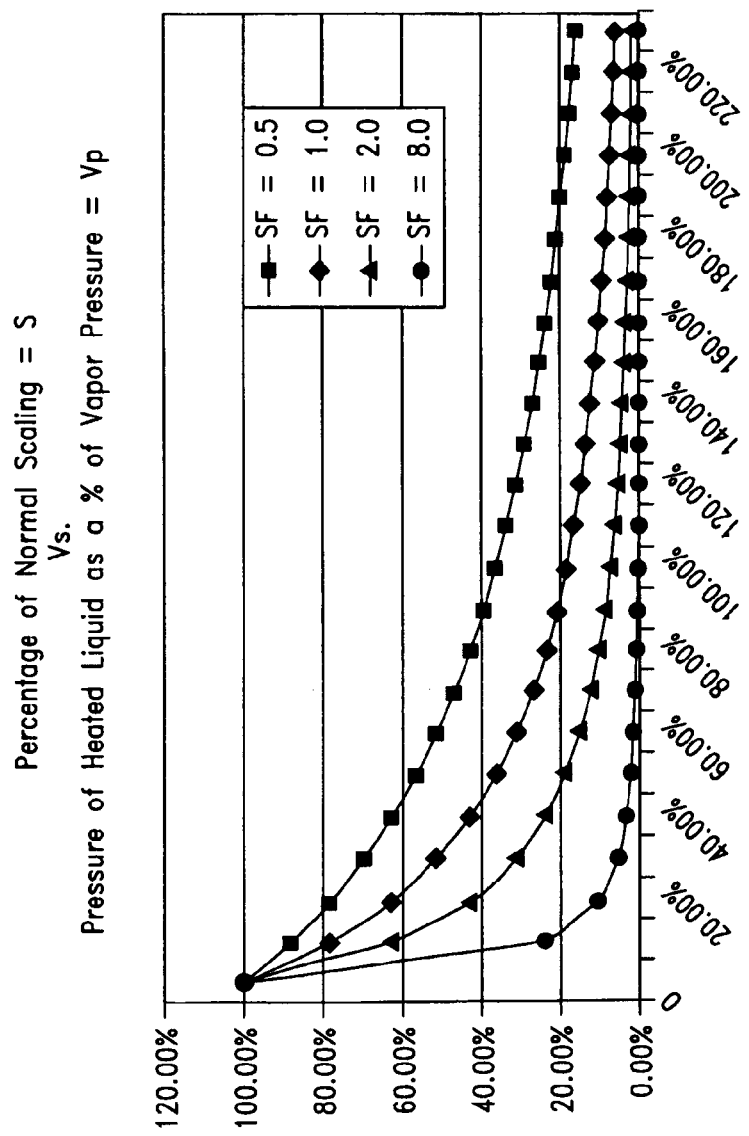
FIG. 4 is a graph illustrating the percent of normal scaling resulting at various pressures of a heated liquid.

FIG. 3 This embodiment is the same as that in FIG. 2 except that an auger (15) is shown removing the solids from the vaporization chamber (01).

DETAILED DESCRIPTION

The essential contribution of the apparatus and method is to produce no effluent and to make the salt available for sale. The difficult problem that this apparatus and method solves is the build up of scale and solids in the heating chamber when producing solid salt. This method of scale reduction relies upon the separation of the heating of the water, from the point where vaporization occurs. The change of state from liquid to vapor occurs in a separate vaporization chamber (01) that can be easily cleaned and the solids removed, and not upon the heating chamber (06). In the current Art, scale forms upon the heating element in a boiler (containing both heating and vaporization) distilling process because this is where, in the current art, the vaporization occurs. With the current art this results in substantial reductions of heating efficiency as the scale that forms on the heating element does not transfer heat efficiently and thus presents a major limitation to achieving low cost and efficient sea water distilling. The traditional solution is to allow only limited concentrations of brine and to flush excess brine as an effluent.

Scale formation in the vaporization chamber (01) disclosed here, does not affect the efficiency of the system as the heating is not done in this chamber. The vaporization chamber (01) can be lined with easily cleaned materials such as rubber or Teflon and can be designed as a filter, that can be flushed, or made large enough to hold substantial quantities of residue, or it could be designed to mechanically remove the accumulated residue. This allows liquids to be entirely removed leaving a near solid residue in some applications and produces no liquid brine output to be disposed of. It also allows the accumulation of the solids that may have economic value.

In the heating chamber (06) the water to be heated is kept at sufficient pressure to prevent any vaporization from occurring. For example if the water is to be heated to 230 degrees F., then it is kept under as much as 50 psi absolute of pressure. The vapor pressure of water at 230 deg F. is about 20 psi absolute. The 50 psi of pressure assures that no conversion to vapor shall occur in this area. The water is then forced through a nozzle into a vaporization chamber (01) where the pressure is reduced to 15 psi absolute or ambient pressure or 1 ATM. In this vaporization chamber (01), a portion of the water will vaporize to form the steam and leave any contaminate behind in this vaporization chamber. As scale formation in this vaporization chamber does not reduce the efficiency of the heating operation, high efficiency can be expected for long periods of time with out shut down for de-scaling in the heating chamber.

Explanation of Operations

The embodiment of this device reduces scale formation roughly according to the following formula.

$$S = 1/(((Vp \times R \times Sf)+1)^{**}2)$$

Where:

S=Scale reduction expressed as a percentage of the normal formation of scale without any pressure or flow.

Vp=Pressure applied to the liquid being heated expressed as a percentage of the vapor pressure of the liquid.

R=Co-efficient of particular liquid Scaling. This varies according to the particular type of liquid being distilled. With sea water this is approximately 1.3

Sf=Scaling factor which is unique to each embodiment of this device. It depends upon the rate of flow of the heated liquid, the concentration of the solids in the heated liquid, and the physical design of the machine.

Example

At 212 Deg F. the Vapor Pressure of water is 15 Psi Absolute

At 230 Deg F. the Vapor Pressure of water is 20 Psi Absolute

If we operate the Still as follows the scaling is reduced according to this example:

Heat water to 230 degrees in the heating chamber where the Vapor pressure is then 20 psi Pressurize the water to 30 psi This yields a Vp of (30/20)=1.5

With a flow rate thru the still of 100 times the distilled water output we can achieve a Sf of 8

This yields a $S=1/(((1.5 \times 1.3 \times 8)+1)^{**}2)=0.0035$ or 0.36% of the usual scaling. This represents a reduction of almost 275 times. Another way of looking at this is that the scale will form 275 times slower on the heating tubes, than in a standard boiler configuration. This means that if you were having to de-scale your boiler once each month, now you can de-scale your boiler once each 275 months or about 23 years.

APPLICATIONS

This apparatus will in one embodiment allow sea water to be turned into pure drinking water and dry salt without any brine effluent. The value of the dry salt produced can more than pay for the cost of operation of the still. The production of the pure water as a by-product is free. This could completely eliminate the fresh water supply problems faced world wide and minimize the impact to the environment.

What is claimed is:

1. A method for distilling of a fluid containing dissolved solids, the method including the steps of:

passing the fluid in a liquid state to a heater at a first pressure;

heating the fluid within the heater to a temperature below its boiling point at the first pressure;

routing the fluid to a vaporization chamber;

expanding the fluid to a second pressure below the first pressure within the vaporization chamber, the second pressure sufficiently low to cause a solvent portion of the fluid to boil into a as within the vaporization chamber while a solids portion of the fluid remains non-gaseous;

discharging the gaseous solvent portion of the fluid, substantially free of dissolved solids, from the vaporization chamber;

removing solids from the vaporization chamber substantially separate from the gaseous fluid;

routing the gaseous solvent portion of the fluid to the heater;

transferring heat from the solvent to the fluid within the heater; and compressing the gaseous solvent portion of the fluid between the vaporization chamber and the heater.

2. The method of claim 1 including the further steps of:

initially entering the fluid to be distilled into the vaporization chamber, then routing a portion of fluid within the vaporization chamber to the heater.

* * * * *